US007050940B2

(12) United States Patent
Basso et al.

(10) Patent No.: US 7,050,940 B2
(45) Date of Patent: May 23, 2006

(54) METHOD AND SYSTEM FOR MAINTAINING AND EXAMINING TIMERS FOR NETWORK CONNECTIONS

(75) Inventors: Claude Basso, Raleigh, NC (US); Richard J. Blasiak, Chapel Hill, NC (US); Philippe Damon, Raleigh, NC (US); Laurent Frelechoux, Lausanne (CH); Brahmanand K. Gorti, Cary, NC (US); Bernard Metzler, Zurich (CH); Bay V. Nguyen, Cary, NC (US); Natarajan Vaidhyanathan, Greensboro, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 10/802,235

(22) Filed: Mar. 17, 2004

(65) Prior Publication Data

US 2005/0209804 A1     Sep. 22, 2005

(51) Int. Cl.
*G06F 15/00* (2006.01)

(52) U.S. Cl. ............... 702/184; 702/176; 702/187; 702/189; 709/231; 709/205; 370/345; 370/350; 713/500; 713/375; 710/61; 716/14

(58) Field of Classification Search ............... 702/176, 702/184, 187, 189, 19; 709/231, 205; 370/345, 370/350; 713/500, 375; 710/61; 716/14
See application file for complete search history.

(56) References Cited

U.S. PATENT DOCUMENTS

| 5,491,815 | A | 2/1996 | Basso et al. |
| 5,495,480 | A | 2/1996 | Yoshida |
| 5,651,113 | A | 7/1997 | Lin et al. |
| 5,659,720 | A | 8/1997 | Fiacco et al. |
| 5,689,699 | A | 11/1997 | Howell et al. |
| 5,978,928 | A | 11/1999 | Rust |
| 6,195,701 | B1 | 2/2001 | Kaiserswerth et al. |
| 6,381,214 | B1* | 4/2002 | Prasad ............... 370/230.1 |
| 6,446,225 | B1 | 9/2002 | Robsman et al. |
| 2004/0117682 | A1* | 6/2004 | Xu ............... 713/400 |

FOREIGN PATENT DOCUMENTS

JP     63-016335     1/1988

(Continued)

OTHER PUBLICATIONS

Yates et al., 'On the Interaction Between an Operating System and Web Server', Jul. 16, 1997, NSF Publciation, pp. 1-9.*

(Continued)

*Primary Examiner*—Marc S. Hoff
*Assistant Examiner*—Elias Desta
(74) *Attorney, Agent, or Firm*—Sawyer Law Group LLP (57) ABSTRACT

System and method for maintenance and examination of timers for a computer system having connections in a networking system. Timer values in a connection table each indicate a timeout for a timer for a connection, where each connection has multiple timers, and one of the timer values is written to a global timer array for each connection such that the global timer array can be scanned to determine when timeouts occur for active connections. Sparse restart of a timer includes restarting the timer if data is communicated with a connected computer before the timeout occurs and after a predetermined time interval after timer start, and not restarting the timer if data is communicated before the timeout occurs and within the predetermined interval after timer start.

45 Claims, 4 Drawing Sheets

FOREIGN PATENT DOCUMENTS

| | | |
|---|---|---|
| JP | 03-131935 | 6/1991 |
| JP | 03-255512 | 11/1991 |
| JP | 04-034633 | 2/1992 |
| JP | 11-175353 | 7/1999 |
| JP | 2000-066903 | 3/2000 |
| JP | 2000-259429 | 9/2000 |

OTHER PUBLICATIONS

Khanna, 'Timer Management in X.25 Layer 2: An Interpretation', 1993, IEEE Publicaiton, pp. 540-543.*

Hou et al., 'Incorporation of Optimal Timeouts into Distributed Real-Time Load Sharing', May 1994, IEEE Publication, vol. 43, No. 5, pp. 528-547.*

Bjorkman, 'Designing Hierarchial Hardware for Efficient Timer Handling', 1990, IEEE Publication, pp. 149-152.*

Beraldi et al., 'A Caching Scheme for Routing in Mobile Ad Hoc Networks and Its Application to ZRP', Aug. 2003, IEEE Publication, vol. 52, No. 8, pp. 1051-1062.*

* cited by examiner

METHOD AND SYSTEM FOR MAINTAINING AND EXAMINING TIMERS FOR NETWORK CONNECTIONS

FIELD OF THE INVENTION

The present invention relates to networking systems providing communication between different devices, and more particularly to the maintenance and examination of timers for a large number of network connections in a networking system.

BACKGROUND OF THE INVENTION

Networking protocols are used to facilitate the communication of data between computer systems and devices. A protocol determines such communication parameters and characteristics as the type of error checking to be used, any data compression methods, how a sending device indicates that it has finished sending data, and how a receiving device indicates that it has received data.

The availability of an accurate and fine-grained timer service is crucial to the efficient implementation of many networking protocols. Timers are used to determine when "timeouts" occur, i.e., when a timer expires, indicating that a predetermined amount of time has passed and that therefore an action or computer functions should be performed. For example, a response timeout occurs when no response from a sought device is received over the network within a predetermined amount of time after sending a request. The occurrence of a timeout can indicate to a device that it should stop waiting for a response, retransmit data, sever a connection to another device on the network, or perform one or more other functions.

Typically in a networking system, each connection of a reliable network protocol maintains several active timers to keep track of different timeouts supported by the protocol. In such protocols, multiple timers are maintained for each particular network connection to control the state of the connection based on predetermined conditions. For example, in the Transmission Control Protocol (TCP), one timer can be a retransmission timer that keeps track of the time elapsed after a request or data is transmitted to a connected device and before an acknowledgement is received from the connected device, so that the sending device can retransmit information if a timeout occurs. An idle timer can keep track of the time since any data frame or signal was last received on a particular connection, such that if an idle or "stale" timeout occurs, the connection can be shut down due to lack of activity. A keepalive timer can be started after an idle timeout occurs to keep track of the time elapsed since sending a test signal to test if the other computer system is still functioning and connected, so that if a timeout occurs before any response is received, the other computer system is considered non-functioning or non-communicative. An acknowledgement delay timer can count down a predetermined duration of time after receiving a packet of data, thereby causing a delay for acknowledging the reception of the packet so that a single acknowledgement can be later sent (when the timeout occurs) after receiving multiple close-together packets, thus promoting a reduction in the amount of unnecessary acknowledgments. All these timers can be maintained for each network connection. For example, networking functions like server load balancing and layer-4 protocol termination require such multiple timers to be maintained per connection of the subject device to another device over the network.

Setting, resetting, and expiration of these timers is typically supported and maintained by a system timer task or service. In many conventional systems, a counter is maintained for each connection timer associated with each connection, the counters being stored in a memory control block associated with each connection in a connection table. The timer task periodically (e.g., every 500 milliseconds) examines the entries of the entire connection table and decrements all the counters for the active connections. A timeout is declared when the value of a counter becomes zero. This method requires several memory-related accesses per connection, such as acquiring a lock to the connection control block so that other tasks may not access the block, a read of the counter value, write to decrement the counter value, and an unlock operation to free the control block for other tasks.

In many implementations of a networking system, a single device can have many different network connections to other devices or systems. Systems implementing networking functions such as server load balancing normally support a large number of connections (e.g., on the order of 100,000 ) and require high throughput. When there are a large amount of active connections with more than one pending timer, a large amount of timer entries must be maintained by the system timer service. Since the examination of the entire connection table for timeouts, and the setting and resetting of timers, are very extensive and frequent protocol operations, maintaining a large amount of active timer entries tends to limit the overall system performance. Typical timer service implementations tend not to scale, and thus become the limiting factor of the protocol stack performance. Multiple memory-related accesses across a large number of connections can result in overall performance degradation and a bottleneck; for example, the packet forwarding code may try to access the connection table (control block) while the timer task has acquired a lock on the connection table while writing or examining timer values.

Accordingly, what is needed is a system and method for more efficiently maintaining timers in networking systems having many connections. The present invention addresses such a need.

SUMMARY OF THE INVENTION

The invention of the present application provides a system and method for maintenance and examination of timers for a computer system having connections to other computers or devices, such as in a networking system. In one aspect of the invention, a method for maintaining timers for a computer system includes writing a plurality of timer values in a connection table, each timer value indicating a timeout for a particular timer associated with one of a plurality of connections, where the connection table includes a plurality of timers for each connection. One of the timer values is written to a global timer array for each connection, such that the global timer array can be scanned to determine when timeouts occur for active connections to the computer system. Similar aspects of the invention provide a computer readable medium including program instructions for implementing similar steps, and a system providing elements for implementing similar features.

In a second aspect of the invention, a method for examining timers for a computer system includes scanning array timer values for timeouts, the array timer values stored in a timer array, where a single array timer value is stored in the timer array for each active network connection to the computer system. A computer system function is caused to be initiated when a timeout is indicated by a particular array timer value associated with a particular active connection, the computer system function being associated with one of a plurality of timers used for the particular active connection. Similar aspects of the invention provide a computer readable medium including program instructions for implementing similar steps, and a system providing a timer task and a processing task for implementing similar features.

In a third aspect of the invention, a method for sparse restart of a timer for a computer system, includes starting a timer which determines when a timeout occurs for an associated network connection of the computer system. The timer is restarted if data is received from or transmitted to the connected computer system before the timeout occurs and after a predetermined time interval after the timer is started. The timer is not restarted if data is received from or transmitted to the connected computer system before the timeout occurs and within the predetermined time interval after the timer is started. Similar aspects of the invention provide a computer readable medium including program instructions for implementing similar steps, and a system providing elements for implementing similar features.

The present invention greatly reduces the time and processing resources needed to maintain and examine timers for timeouts occurring in network connections between computer systems. One aspect of the invention maintains a single timer value per network connection within a global timer array, thus allowing the examination of timer values to be simplified and expedited. Another aspect of the invention provides sparse restarts of a timer relative to prior art implementations, promoting more efficient memory operations and accesses when examining and maintaining timeouts.

DETAILED DESCRIPTION OF THE INVENTION

The present invention relates to networking systems providing communication between different devices, and more particularly to the maintenance and examination of timers for a large number of network connections in a networking system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of a particular systems provided in particular implementations. However, one of ordinary skill in the art will readily recognize that this method and system will operate effectively in other implementations. For example, the computer systems usable in the present invention can take a number of different forms. The present invention will also be described in the context of particular methods having certain steps. However, the method and system operate effectively for other methods having different and/or additional steps not inconsistent with the present invention.

Figure 1:
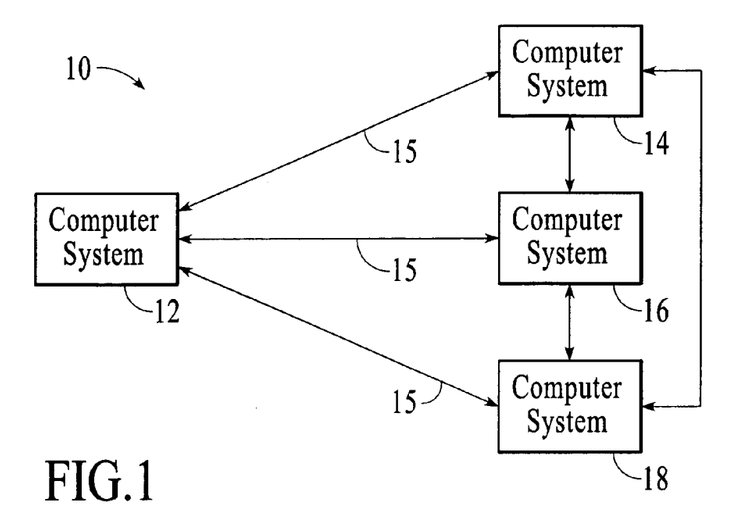
FIG. 1 is a block diagram illustrating a networked system suitable for use with the present invention.

FIG. 1 is a block diagram of a networked system 10 suitable for use with the present invention. System 10 includes a number of individual computer systems which can communicate with each other via computer network connections and one or more network protocols governing the communication. From the point of view of computer system 12, communication links 15 are established from computer system 12 to the other computer systems, including computer systems 14, 16 and 18 (which can also communicate to each other). The communication links 15 can be physical links (wire connections, etc.) or wireless links implemented via radio signals, infrared signals, etc. The networked computer systems can communicate via one or more well-known networking protocols, such as Transmission Control Protocol (TCP) or Stream Control Transmission Protocol (SCTP), which each have their own rules for transmitting signals or data, receiving signals or data, and providing timeouts to help maintain and update connections.

In some implementations that are well-suited to the present invention, computer system 12 has many connections to other computer systems. For example, some systems may have on the order of 100,000 connections. Efficiently checking for timeouts for all these connections according to the present invention is described in greater detail below with respect to FIGS. 2–4.

The computer systems can take a variety of different forms, such as desktop computers, workstations, mainframe computers, portable computers, electronic devices, etc. Each computer system 12, 14, 16, and 18 can include one or more processors (microprocessors, application specific integrated circuits, etc.), memory (RAM and/or ROM), storage capability (disk drive, optical disk, etc.), and input/output (I/O) components (network interface, input devices, output devices (display, printer, etc.)), as is well known.

Figure 2:
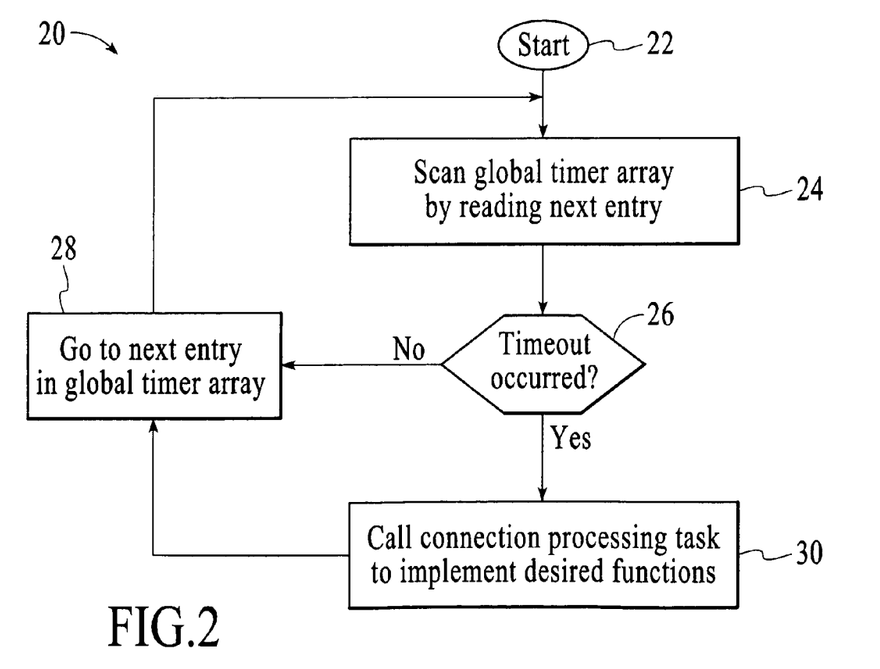
FIG. 2 is a flow diagram illustrating a method of the present invention for providing a timer system service to check for timeouts occurring for active connections.

FIG. 2 is a flow diagram illustrating a method 20 of the present invention for providing a timer system service or task during operation of the computer system 12 to check for timeouts occurring for active network connections of the computer system. Method 20, as well as the other methods described herein, are preferably implemented using program instructions (software, firmware, etc.) that can be executed by a computer system and are stored on a computer readable medium, such as memory, hard drive, optical disk (CD-ROM, DVD-ROM, etc.), magnetic disk, etc. Alternatively, these methods can be implemented in hardware (logic gates, etc.) or a combination of hardware and software.

Method 20 is described from the point of view of one computer system 12 having several network connections to other computer systems 14–18 ("connected computer systems") as shown in FIG. 1. In a described embodiment, as explained below, this method can run concurrently with the method of the present invention for writing timer data and implementing associated network functions, as described below with reference to FIG. 4. The method 20 can be executed periodically, for example every 0.1 seconds, or other appropriate time interval.

The method 20 begins at 22, and in step 24, the timer system service scans a global timer array of the present invention by examining an entry of the global array. The global timer array is an array stored preferably in memory of the computer system, and is associated with a network connection table that is also typically stored in memory of the computer system and which holds timer data related to the active network connections currently being maintained by the computer system.

Figure 3:
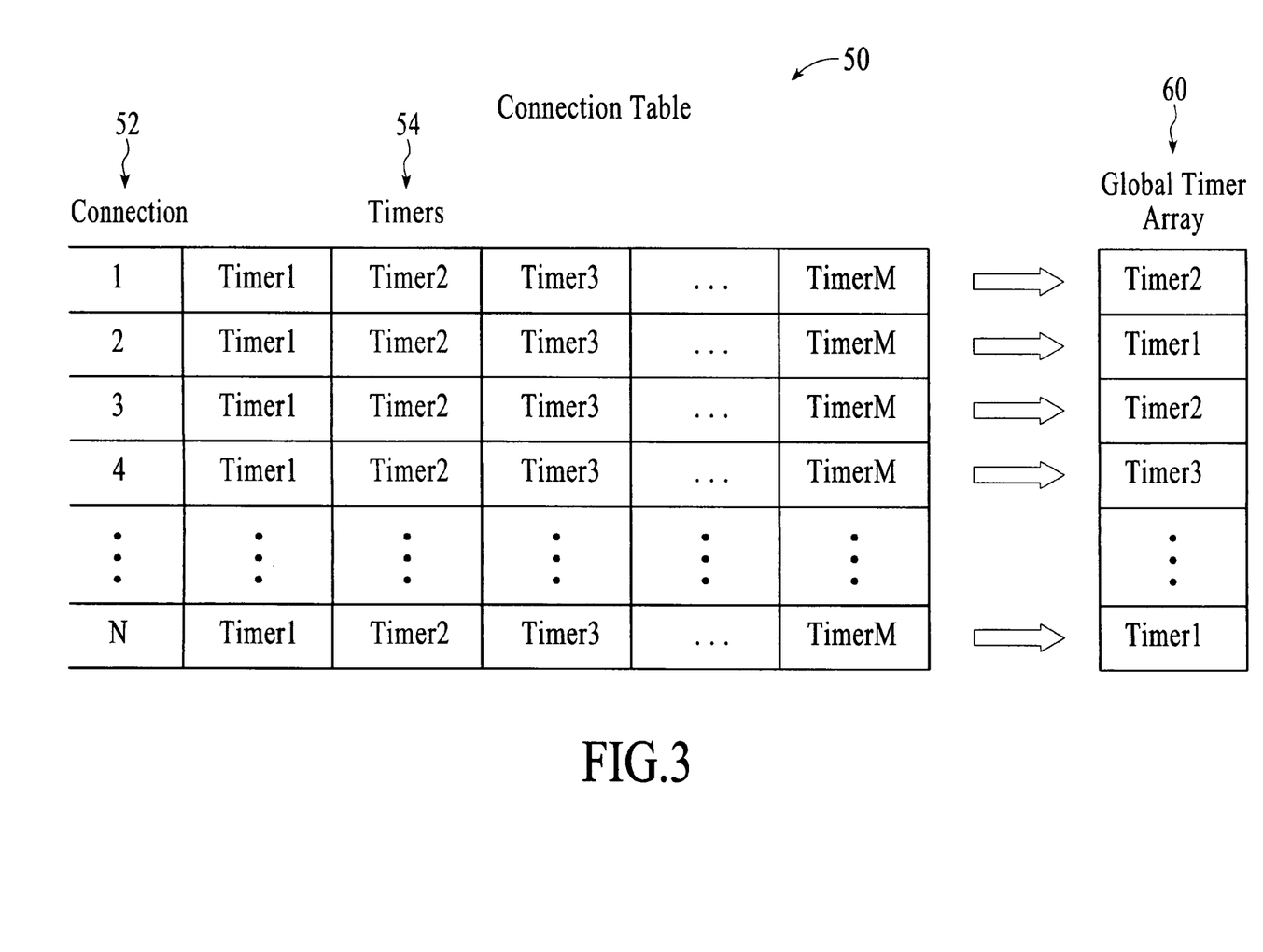
FIG. 3 is a diagrammatic illustration showing a connection table and a global timer array of the present invention.

FIG. 3 is a diagrammatic illustration of an example of a network connection table 50 that can be used for the present invention. Each horizontal row or block of the table corresponds to a single network connection. The connection table 50 holds values for all the timers used for each active network connection to computer system 12. Thus, the number of connections is shown in one column 52 of the table, up to N connections, and the number of timers for each connection is shown in column 54 of the table. A number of timers, shown as Timer1, Timer2, Timer3, etc., are provided for each connection 52, up to TimerM for M timers. For example, Connection 1 may be associated with a Timer1 that is a retransmission timer, a Timer2 that is a keepalive timer, and a Timer3 that is an idle timer. Different connections may be governed by different protocols and thus may have different amounts and types of timers and timer values.

In the described embodiment, each timer value stored in the connection table 50 is an "expiry timestamp," which is the expiry time (in the future) at which a particular timeout is to occur, i.e., when a timer will expire. The expiry timestamp is compared periodically to the current time to determine if and when a timeout occurs. This type of timeout can be more efficient than, for example, providing a counter value that must be decremented or incremented at regular intervals, as in many other timeout implementations. However, other embodiments of the invention can provide such counter values as the timer values provided in the connection table 50.

FIG. 3 also illustrates a global timer array 60 of the present invention, e.g., in memory of the computer system 12. The global timer array 60 stores one timer value entry for each connection 52 in the connection table 50. The one timer value stored in an entry of the global array is the timer value, out of all the timer values for that connection, that will soonest expire, e.g., has the lowest timer value in the expiry timestamp implementation described above. In some embodiments of the present invention, a copy of the soonest-to-expire timer value is also stored as a "local copy" in a predetermined area of the connection table 50 for each connection, as described with reference to FIG. 4.

It should also be noted that the array structure of global array 60 can be implemented in many different ways; the term "global timer array" is intended to refer to any structure or way in which these timer values can be stored so as to be quickly accessed and scanned. In some embodiments, the global timer array can be partitioned into multiple sections, each with a subset of entries. For example, L sections can be partitioned, where L is less than or equal to the number of connections N, such that each section has N/L entries. For more efficiency, each section of the array can be stored in a separate fast memory, e.g., if memory capacity is limited.

In an alternate embodiment, other types of timer values can be stored in the global timer array 60. For example, counter values can be used to indicate when a timeout will occur, where the counter value is decremented (or incremented) periodically and a timeout is indicated when the counter value has reached a predetermined number, such as zero. The counter value closest to zero can be stored in the global timer array in such an embodiment. Thus, the term "timer value" is used herein to mean a timestamp value, counter value, or other timer indicator.

Referring back to FIG. 2, in next step 26, the timer task checks whether a timeout has occurred. For example, in the expiry timestamp embodiment, it is checked whether the current time is greater than the timer value in the examined entry of the global array. The current time, for example, can be indicated by a current timestamp or counter value quickly retrieved from an appropriate register in a processor which uses incrementing bits to track time, or can be implemented in other ways. If the timeout has not occurred (e.g., the current time has not yet reached the timer value), the process continues to step 28 to cause the timer task to go to the next entry in the global timer array (which is associated with a different connection), after which the timer task reads the associated timer value of that next entry in step 24 and compares it to the current time in step 26. In other embodiments, the check for a timeout occurring can be different. For example, if decrementing counter values are used instead of expiry timestamp values in the global array, then step 26 would check whether the counter value in the examined array entry is zero, thus indicating that the timer has expired.

If timeout for the connection has been found to have occurred in step 26, the process continues to step 30, where the timer task calls or triggers a connection processing task. The connection processing task checks which timer(s) have expired for the connection, implements the timeout functions associated with the particular timeout(s), and resets timer values if appropriate. This is described in greater detail below with respect to FIG. 4. The process then continues to step 28 to go to the next global array entry, and can start back at the beginning of its scan of the global array if all the entries have been scanned.

In some embodiments, besides the timer system task, other tasks may be able to search the global timer array to check for timeouts. For example, a network task or picocode (instructions running on a network processor) that is handling packets for a connection may check for the expiration of a timer for a particular connection. This check can be performed any time when that task is processing an event on the connection. For example, the task could check a global array entry to see if a timer will expire within a predetermined short amount of time (e.g., a few milliseconds). If so, that task can set the global array entry to zero or to the next earliest-to-expire timer value at the time it is checking it, so that the timer system task will not detect an already-processed timeout when it later scans the same array entry. This can be advantageous if the timer task is taking too long to search the entire global timer array.

In a different embodiment having counter values in the connection table rather than expiry timestamps, the value of all counters for timer values in the global array can be periodically decremented (or incremented) by a task such as the timer system task of method 20. The associated counter values in the connection table need not be updated by the timer system task in such an embodiment, since a connection's counter values in the connection table can be derived and updated when the connection table is accessed by a connection processing task as in FIG. 4, e.g. when a timeout is found to occur for that connection.

The global timer array of the present invention allows the checking and maintenance of timer values to be much quicker than in the prior art, where all the timer values in the connection table had to be scanned. The timer value stored within the global timer array represents the expiration time of the next-to-expire timer out of all active timers from the given connection. This array thus stores only a single timer value per protocol connection, rather than the several timer values per connection of the connection table, requiring only a single value to be checked for each connection rather than multiple values. Furthermore, in the described embodiment the global timer array is not part of the connection table/control block but is completely separate, and thus can be dedicated to the timer task and accessed without requiring time- and process-expensive operations such as acquiring a semaphore. The timer system task thus preferably does not, and does not need to, access the connection table to determine if timeouts have occurred in the connections.

An important feature of the global timer array of the present invention is that it is independent of any specific protocols. Only a timer value for each connection is stored, so that a timer task need only check the timer values for timeouts, regardless of protocol. Protocol-specific information is only required when the timer values in the connection table are accessed by the connection processing task after a timeout is found in the global timer array.

Another advantage of the global timer array is that it is smaller in storage size than the data in the connection table 50. Therefore, it can be placed in smaller, faster memory that can be accessed more quickly than the connection table 50. For example, the global timer array can be placed in faster SRAM rather than DRAM, while the connection table is not as flexible and is typically placed only in DRAM due to its size.

In some embodiments, as in the embodiment described above, the global timer array can be searched using a single processor and thread. In other embodiments, this array can be searched with two or more processors and/or threads (e.g., a particular processor may have more than one execution thread, where each thread can independently execute program instructions such as a task). For example, the global timer array can be partitioned into several sections or subsets, each section having a number of entries, as mentioned above. Not only can each section of the array be stored in a separate fast memory (as described above); each section can also (or alternatively) be independently scanned, in parallel, using a separate processor or thread. Method 20 can therefore be executed in parallel using multiple processors in the system and/or multiple threads, each processor or thread implementing a method 20 on a different portion of the global timer array, such that multiple system timer tasks are operating in parallel. This can improve the scalability of the process, that is, both the total number of timers that the system can support and the precision of the timers, by distributing the workload to the available hardware. The precision of the timers is improved by scanning the global timer array more quickly using multiple processors/threads. Thus, whenever "the" system timer task is referred to herein, the appropriate one (or more) of multiple parallel system timer tasks can be indicated in embodiments having such multiple tasks.

Figure 4:
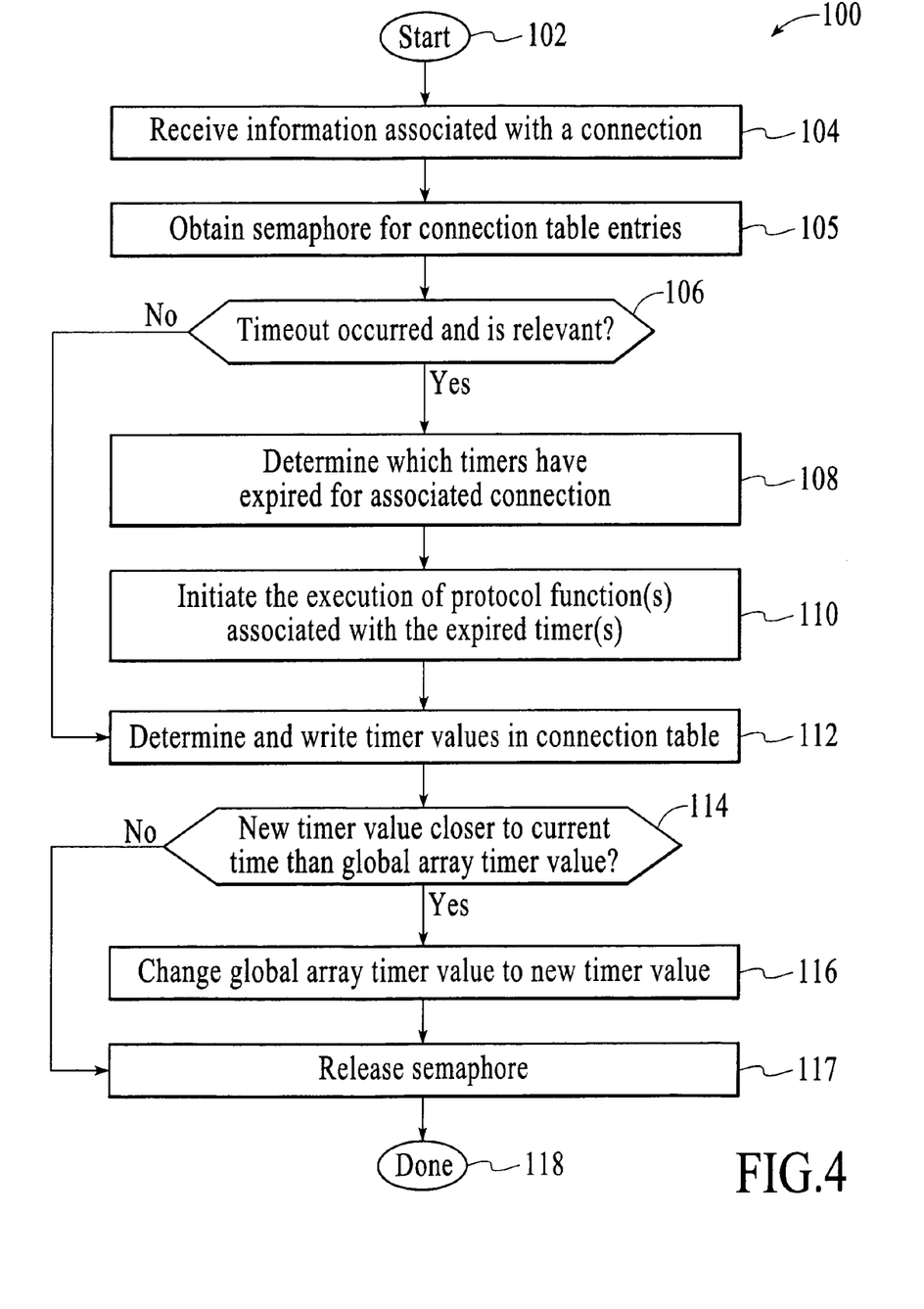
FIG. 4 is a flow diagram illustrating a method of the present invention for maintaining and updating changes to the timers.

FIG. 4 is a flow diagram illustrating a method 100 in accordance with the present invention for maintaining and updating the timers used with the present invention. Method 100 is described from the point of view of one computer system 12 having several connections to other computer systems 14–18 ("connected computer systems"). In the described embodiment, some or all of this method can run concurrently with the method of the present invention for scanning the timer data for timeouts, as described above. In the described embodiment, this method 100 is implemented using a connection processing task running on the computer system 12 that gets called or triggered by another task, such as the timer system service of FIG. 2. The method 100 and connection processing task may be also triggered by other tasks and events, mainly an occurrence of network activity, such as the creation of a connection to another connected computer system, or the need for data to be exchanged on a particular existing network connection. Method 100 pertains to the functions of the connection processing task dealing with timeouts and timers, and does not address other functions that may be handled by this processing task.

The method begins at 102, and in step 104, the connection processing task receives information from the calling task identifying and associated with an active connection of the system 12, for which the processing task is to modify information. The connection processing task of method 100 is called typically because of one or more events. For example, the timer system service of FIG. 2 may have called method 100 in step 30 when a timeout is detected in the global timer array for the connection. In other situations, a network task has determined that data is to be sent over the connection, and has called the connection processing task to reset or start timers. Similarly, a network task may have received a response to a pending request on the connection, or created the connection as a new connection to another computer system 12, or detected that the connection has become inactive, any of which may require the connection processing task to reset or change timer values. In other situations, the time at which a timer is set to expire may change; for example, when a retransmit timer is stopped because acknowledgment is received and now a different timer like an idle timer becomes the earliest expiry which needs to be updated in the global timer array.

The calling task can send method 100 the needed information, such as an identification of the particular network connection having the timeout or network activity, and the type of network activity if appropriate. In some embodiments, the connection processing task can then look up the other information as needed, e.g., by looking in the global timer array 60 and/or connection table 50. In other embodiments, the calling task can pass additional information to method 100, such as the value in the global timer array which indicates a timeout.

In step 105, a semaphore or lock can be obtained to gain exclusive access to the desired connection table entries associated with the connection at issue, to read and write timer value(s) to those entries. Other running tasks thus will not be able to perform operations on these connection table entries while the method 20 is accessing them.

In next step 106, the method checks whether a timeout was found to occur and is still relevant. A timeout may not have occurred because the connection processing task may have been triggered by a non-timeout connection event or called by a different task other than the timer system service, and thus the connection processing task may not need to address the consequences of a timeout. Or, a found timeout may no longer be relevant. After semaphore lock in step 105, the connection processing task typically examines the state of the connection, as well as examining the contents of the data received (if appropriate). Such information may change previous assumptions and make the found occurrence of a timeout irrelevant. For example, even if the method 100 has been called by the timer system service due to a timeout detected in the global array, the examination of connection status and a received data packet might reveal that the packet was actually received before timeout occurred, so that the associated timer should be reset rather than a timeout processed. Thus, if a timeout was not found to occur and the connection processing task (and method 100) was called for a reason other than timeout (such as network activity), or if the timeout is found to be irrelevant for other reasons, the process continues to step 112, described below.

If a timeout has been found to occur and is still relevant, then in next step 108, the task determines which timer(s) have expired for the associated connection, e.g., which timer was associated with the expired timer value found in the global timer array. In the described embodiment, this is accomplished by comparing the global array's value to all the timer values stored in the connection table for the associated connection. The expired timer is the timer having the timer value that matches the value stored in the global timer array. Thus, for example, it might be determined that Timer2 has expired, which may be an idle timer. In some instances, more than one timer for the connection has expired at the same time, e.g., if more than one timer value for that connection in the connection table matches the expired value in the global array. In those embodiments where a copy of the global timer array value is stored in the connection table, the copy value can be retrieved during this step for the comparison without having to access the global timer array.

In step 110, the method initiates the execution of the protocol function(s) (and/or other computer system functions) associated with the expired timer(s). In many embodiments, the processing task itself performs the required functions since the semaphore may need to be held when processing. Thus, for example, if a retransmission timer has expired, then the execution of the functions appropriate to the timeout of a retransmission timer are initiated. Such functions might include causing computer system 12 to retransmit data which was previously sent for which no acknowledgement has yet been received from the receiving computer system. For other types of timeouts, the functions can include shutting down a connection, acknowledging received data, etc.

In next step 112, the process determines and writes timer values in the connection table. One or more timer values are written into the table entry in the appropriate timer block of the connection table for the connection.

The timer values to be written can depend on the event that triggered the connection processing task of method 100. For example, if a timeout occurred, then the timer value for the expired timer in the connection table may need to be reset to its full value, e.g. a predetermined number of seconds, according to the rules of the protocol governing that connection, such as TCP. (In some protocols or implementations, timer values may not need to be written, even if timeout has occurred). If data is to be sent over a connection, if a response is received to a pending request, if a new connection is made between the computer system 12 and another computer system, or if a packet arrives from a computer system not previously actively connected, appropriate timers (such as an idle timer) can be set or reset according to the rules of the protocol. If a connection becomes inactive, a null indicator, such as zero, can be written as a timer value for that connection. One method of the present invention for restarting an idle timer is described below with reference to FIG. 5.

To determine the new timer values in an expiry timestamp embodiment, the method gets a predetermined "timeout parameter," expressed in the appropriate time units, for each one of the timers used for the connection that needs to be written or changed. The timers used for a connection are determined by the particular protocol used for that connection. The timeout parameter (which can be user-configurable, depending on the embodiment) indicates how long that timer should last before the timeout occurs. The timeout parameter can be retrieved from memory or other convenient storage, and is typically associated with the particular protocol being used. The method adds the timeout parameter to the current time to determine the timer value (timestamp) that is written to the connection table. In a counter embodiment, a counter value can be similarly obtained from protocol data in memory which indicates how long the timer should last before timeout occurs.

In step 114, the method checks whether any of the newly-written timer value(s) of step 112 will expire sooner than the timer value already stored in the global timer array 60 for this connection, e.g., whether the new value is closer to the current time in the expiry timestamp embodiment. If not, then no further action is needed, and the process is complete at 118. If any of the newly-written timer values will expire sooner than the associated value in the global timer array, then in step 116 the method changes the timer value in the associated entry of global timer array 60 to the value of the newly-written timer value that will soonest expire. In those embodiments in which a local copy of the global timer value is stored in the connection table, the local copy is also updated to the newly-changed timer value. Thus, these steps cause the timer value soonest to expire to be continually updated to the global timer array entry. It should be noted that, the first time a global array entry is written, the new value is simply written to the array entry, since there is no pre-existing value with which to compare.

After step 116, the connection processing task releases the lock on the connection table entry in step 117, and the process is complete at 118.

Sparse Restart of Timers

Figure 5:
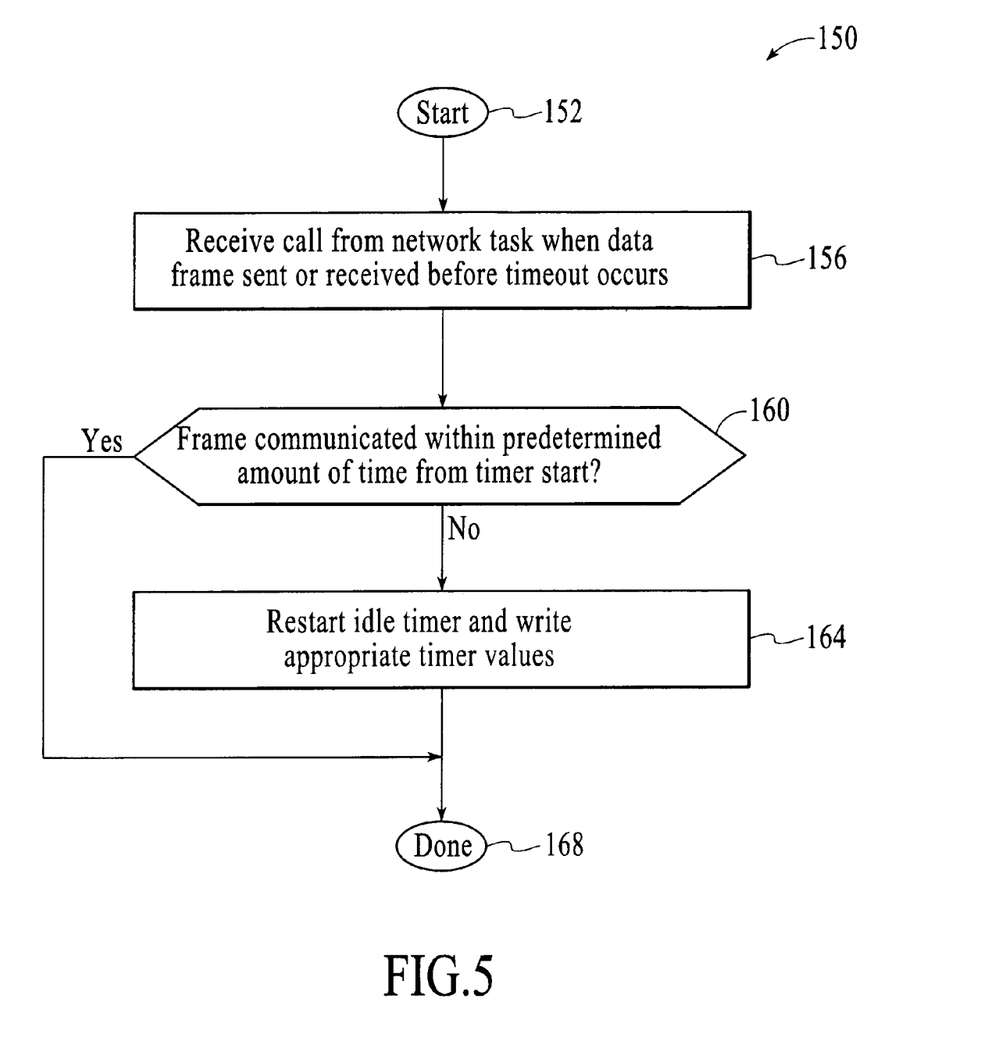
FIG. 5 is a flow diagram illustrating a method of the present invention for processing a timer and timeout using a sparse restart of the timer.

FIG. 5 is a flow diagram illustrating a method 150 of the present invention for processing a timer and timeout using a sparse restart of the timer. This method 150 can be a task invoked by a network task when a timer is to be started. For example, for an idle timer that checks for idle timeout, the timer is started after a data frame is received or transmitted. The idle timer is started so that the amount of time passing after the last data exchange can be tracked. If this amount of time reaches a predetermined timeout amount, then that connection has not received any new data for a while, and the connection is considered to be idle; a check is then made to see if the connected computer is still responding, and if it is not, the connection is made inactive. If, however, a new frame is received or transmitted before the idle timeout occurs, then the timer is reset and restarted.

Method 150 describes a more efficient way of restarting the timer. It should be noted that this method can be used with the global timer array embodiment described with reference to FIGS. 2–4 simply by adding steps 158 and 160 to the process 100 of FIG. 4 for the connection processing task. Such an embodiment is described below. The full method 150 described in FIG. 5 is presented more generally, however, so as to be applicable to any number of possible embodiments.

The method begins at 152, and in step 156, a call is received from a task, such as a network task, to begin the process 150. The calling task has noted that a data frame has been communicated (i.e., sent from or received by) to or from the computer system 12 on a particular connection, and the timeout for any timers associated with this connection has not yet occurred.

Method 150 is called by the task when the communicated frame (received or transmitted) is not the first frame to have started the current timer span. For example, the first frame of an idle timer span causes the restart of the idle timer by definition, and thus the call of method 150 would occur when the calling task determines that the frame is the second or later frame communicated after this first frame.

In step 160, the method checks whether the frame was communicated within a predetermined amount of time since the timeout timer was started (e.g., for an idle timer, a predetermined amount of time since the first frame was communicated). The predetermined period of time is preferably a fraction of the total running time or duration allotted to the timeout timer. For example, the predetermined amount of time can be 0.1 seconds if an idle timeout occurs after a duration of 1 second.

If the frame was not received within the predetermined amount of time, then the process continues to step 164 to restart the timer and write other appropriate timer values. For example, a connection processing task can be called, similar to method 100, which can obtain a semaphore (if needed) and restart the timeout timer by writing an appropriate timer value in the network connection table for the appropriate connection. The soonest-to-expire (i.e., earliest) timer value of all the timer values for that connection can be written to the global timer array in embodiments having such an array. Step 164 is thus like steps 105, 112, and 116 of FIG. 4. For example, restarting an idle timer is the normal function if a frame is received or transmitted within the duration of the timer, before it has expired.

If, however, the frame was received within the predetermined amount of time in step 160, then according to the present invention the process skips the restarting step 164 and the process is complete at 168. Thus, one or more frames can be received, and if those frames were received within the predetermined time period of timer start, they will not cause a timer restart.

If the timeout occurs as detected by the timer system service (such as the method 20 of FIG. 2), then the execution of the timeout function(s) associated with the timeout are initiated or instructed to be performed, similar to step 110 of FIG. 4. For example, a typical action after idle timeout has occurred is to start a keepalive timer, which causes a test signal to be sent to determine if the connected computer system is still functioning or connected. Or, after idle timeout has occurred, the connection to the other computer system can be shut down, where the connection has been determined to be a "stale" or "idle" connection. The idle timeout can occur only if no frames are received or transmitted within the duration of the idle timeout timer, or if all frames have been received/transmitted within the smaller predetermined period of time.

With regards to the embodiment of FIGS. 2–4, the sparse restart of a timer can be added by adding step 160 to the method 100 of FIG. 4. The connection processing task that runs method 100 knows by examining the connection state whether a communicated frame is the first frame or a later frame. Step 160 can be added to method 100 to follow the positive result of step 114, such that a positive result of step 160 flows to step 117, and a negative result of step 160 flows to step 116. This allows the resetting of a timer value in the global array to be avoided for close-following frames (resetting timer values in the connection table can still be performed in step 112 of FIG. 4 with little cost since other connection state values need to be written to the connection table anyway; in embodiments not having the global array, such connection table timer resets are avoided).

Thus, the present invention's use of a sparse restart timer does not cause the restart of the timeout timer when frames are received soon after the timer is started. In prior networking systems, if a frame were received soon after timer start, then the timer(s) would be restarted. This can require that a semaphore be obtained and the timer restart values written each time a new frame is received, causing additional operations and potential delay, especially if many frames are received in a short period of time. The present invention, in contrast, advantageously checks whether one or more frames are received close in time to the start of the timer; if they are, and if no more frames are received further in time and before timeout occurs, then the timeout is still considered to have occurred using only a slightly smaller timer span and without having to perform the time-consuming operations to restart the timer. For example, an idle timeout may be set to 1 second and restarted when a first frame is received. A second frame is received and is processed 0.09 seconds after the idle timer is started. In the prior art, the idle timer would be reset when the second frame is received, even if no additional frames are received, which causes wasteful memory operations. In the present invention, since the second frame was received within the 0.1 second window, the idle timer is not reset, and the timeout is allowed to occur at 1 second after the first frame, which is 0.91 seconds after the second frame was received. The 0.91 second duration is close enough to the normal one second duration to still offer a good indication that it has become an idle connection, while offering the benefit of avoiding the costly memory operations, thereby using fewer processor resources such as instruction bandwidth and control store memory bandwidth.

The described sparse restart of a timer of the present invention works well for idle timeouts because the length of time for the idle timeout is typically relatively long compared to the amount of time between frames or packets received close together. However, this method can also be used for other types of timers and timeouts, especially those with relatively long timespans.

ALTERNATE EMBODIMENTS

In alternate embodiments of the invention, the sparse restart of timers as described above can be used in embodiments which do not use the global timer array of the present invention. In such embodiments, the timer task of FIG. 4 can search through the connection table 50 for timeouts instead of examining the global timer array 60. A semaphore typically needs to be acquired before the connection table can be searched.

In such an embodiment where the entire connection table is searched by the timer task for timeouts, the timer task can read the timer values from all the table locations to determined if a timeout has occurred. Various methods can be used to allow the task to traverse the leaves of the connection table (e.g., memory tree) quickly. For example, multiple tree search engines can be used, and the timer values can be divided among two or more memory banks to facilitate faster reading. More than one connection table entry can be read at a time. Timer values can also be packed into a single memory bank (e.g., a single DRAM bank).

Furthermore, the timer task can not only identify those entries in the connection table that have expired timers, but also can identify the connections that are expected to have timeout conditions the next time the timer task runs. A list of these future-expiring connections can be stored as a memory cache, so that when the timer task next runs, it can search the connections on this list first, before searching other table entries. For example, each list entry can be a pointer to the associated connection table entry. In addition, multiple such lists of future expirations can be stored in the cache. For example, entries expected to timeout in 0.1 seconds can be stored on one list, entries expected to timeout in 0.2 seconds can be stored on a different list, and entries expected to timeout in 0.3 seconds can be stored on another list. If the lists are maintained by a single process or thread then there is no need to use semaphore locks, or to keep them precisely accurate. If something happens, such as a frame arriving which resets a timeout, the connection table entry does not need to be removed from these lists. When the timer task runs it will check the connection table entry and conclude that there is no timeout.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for maintaining timers for a computer system, the method comprising:
   (a) writing a plurality of timer values in a connection table, wherein each timer value indicates a timeout for a different timer, and each timer is associated with one of a plurality of connections of the computer system, and wherein each one of the connections is associated with a plurality of the timers; and
   (b) writing one of the timer values for each of the connections to a global timer array, such that the global timer array can be scanned to determine when timeouts occur for active connections to the computer system.

2. The method of claim 1 wherein each of the timer values written to the global timer array for each connection is associated with the timer that will expire earliest out of the plurality of timers associated with that connection.

3. The method of claim 2 wherein each timer value is a timestamp indicating at what time the timeout will occur.

4. The method of claim 3 wherein the timestamp is compared to the current time to determine if the timeout has occurred.

5. The method of claim 1 wherein if a timer value changes, a new timer value is written to the connection table, and if the new timer value would expire sooner than the associated timer value stored in the global timer array, the new timer value is written into the global timer array in place of the associated timer value.

6. The method of claim 1 further comprising periodically running a timer task to examine the global timer array for timeouts.

7. The method of claim 6 wherein when a timeout is found in the global timer array, the associated timer value in the connection table is referenced and the functions associated with the timeout are initiated.

8. The method of claim 1 wherein the timer value is a counter value that is periodically incremented or decremented until a predetermined value is reached to indicate a timeout.

9. The method of claim 1 wherein the plurality of timers for each connection include an idle timer for determining an idle time of a connection, a keepalive timer for determining if a connected computer system is responding, and a retransmission timer for determining when data should be retransmitted to the connected computer system.

10. The method of claim 1 wherein the timers of a connection are associated with a particular communication protocol used for that connection.

11. The method of claim 10 wherein the communication protocol is Transmission Control Protocol (TCP).

12. The method of claim 1 wherein at least one timer value is written to the connection table when a timeout or network activity occurs.

13. A method for examining timers for a computer system, the method comprising:
   (a) scanning a plurality of array timer values for timeouts, the array timer values stored in a timer array and each array timer value representing a timer, wherein a single array timer value is stored in the timer array for each one of a plurality of active network connection to the computer system, and wherein each one of the active network connections is associated with a plurality of timers; and
   (b) causing a computer system function to be initiated when a timeout is indicated by a particular array timer value associated with a particular active connection, the computer system function being associated with one of the timers used for the particular active connection.

14. The method of claim 13 wherein the single array timer value for each active connection is associated with the timer that will expire earliest out of the timers for the active connection.

15. The method of claim 13 wherein when the timeout is indicated, at least one of a plurality of table timer values is referenced in a connection table, each table timer value being associated with one of the timers used for the particular active connection.

16. The method of claim 15 wherein the referenced table timer value matches the array timer value indicating the timeout.

17. The method of claim 13 further comprising writing the earliest of the table timer values for the active connection to the timer array.

18. The method of claim 15 wherein the array timer values and the table timer values are timestamps indicating at what time each timeout will occur, and wherein a timestamp is compared to the current time to determine if a timeout has occurred for that timestamp.

19. The method of claim 15 wherein the array timer values and the table timer values are each a counter value that is periodically incremented or decremented until a predetermined value is reached to indicate a timeout.

20. The method of claim 15 wherein the plurality of table timer values for the active connection include an idle timer value for determining an idle time of the connection, a keepalive timer value for determining if a connected computer system is responding, and a retransmission timer value for determining when data should be retransmitted to the connected computer system.

21. The method of claim 13 wherein the timers of a connection are associated with a particular communication protocol used for that connection.

22. The method of claim 13 wherein the scanning of array timer values includes scanning only a subset of the array timer values, and wherein a different subset of the array timer values is scanned in each one of a plurality of processes scanning the array in parallel.

23. A method for restarting a timer for a computer system, the method comprising:
 (a) starting a timer, the timer for determining when a timeout occurs for an associated network connection of the computer system;
 (b) restarting the timer if data is received from or transmitted to the connected computer system before the timeout occurs and after a predetermined time interval after the timer is started; and
 (c) not restarting the timer if data is received from or transmitted to the connected computer system before the timeout occurs and within the predetermined time interval after the timer is started.

24. The method of claim 23 further comprising initiating a computer system function if the timeout occurs.

25. The method of claim 24 wherein the timer is an idle timer for determining whether a timeout occurs after a period of time in which no communication occurs on the network connection associated with the idle timer.

26. The method of claim 24 wherein the computer system function includes making the network connection inactive.

27. The method of claim 23 wherein the timer includes a timer value that is a timestamp indicating at what time the timeout will occur, and wherein the timestamp is compared to the current time to determine if the timeout has occurred.

28. The method of claim 23 wherein the timer includes a timer value that is a counter value that is periodically incremented or decremented until a predetermined value is reached to indicate a timeout.

29. The method of claim 23 wherein the timer includes a timer value that is stored in a connection table storing all the timer values for all network connections to the computer system.

30. The method of claim 23 wherein the timer includes a timer value that is stored in a global timer array, the timer value associated with the timer that will expire earliest out of a plurality of timers for the network connection.

31. The method of claim 23 wherein the timer is associated with a particular communication protocol used for that connection, wherein the communication protocol is Transmission Control Protocol (TCP).

32. A computer readable medium including program instructions to be implemented by a computer, the program instructions for maintaining timers for a computer system, the program instructions implementing steps comprising:
 (a) writing a plurality of timer values in a connection table, wherein each timer value indicates a timeout for a different timer, and each timer is associated with one of a plurality of connections of the computer system, and wherein each one of the connections is associated with a plurality of the timers; and
 (b) writing one of the timer values for each of the connections to a global timer array for each connection, such that the global timer array can be scanned to determine when timeouts occur for active connections to the computer system.

33. The computer readable medium of claim 32 wherein each of the timer values written to the global timer array for each connection is associated with the timer that will expire earliest out of the plurality of timers for associated with that connection.

34. The computer readable medium of claim 33 wherein each timer value is a timestamp indicating at what time the timeout will occur, wherein the timestamp is compared to the current time to determine if the timeout has occurred.

35. The computer readable medium of claim 32 wherein if a timer value changes, a new timer value is written to the connection table, and if the new timer value would expire sooner than the associated timer value stored in the global timer array, the new timer value is written into the global timer array in place of the associated timer value.

36. A system for maintaining timers for a computer system, the system comprising:
 a connection table writer for writing a plurality of timer values in a connection table, wherein each timer value indicates a timeout for a different timer, and each timer is associated with one of a plurality of connections of the computer system, and wherein each one of the connections is associated with a plurality of the timers; and
 a global array writer for writing one of the timer values for each of the connections to a global timer array, such that the global timer array can be scanned to determine when timeouts occur for active connections to the computer system.

37. The system of claim 36 wherein each of the timer values written to the global timer array for each connection is associated with the timer that will expire earliest out of the plurality of timers associated with that connection.

38. A computer readable medium including program instructions to be implemented by a computer, the program instructions for examining timers for a computer system, the program instructions implementing steps. comprising:
 (a) scanning a plurality of array timer values for timeouts, the array timer values stored in a timer array and each array timer value representing a timer, wherein a single array timer value is stored in the timer array for each one of the plurality of active network connection to the computer system, and wherein each one of the active network connections is associated with a plurality of timers; and
 (b) causing a computer system function to be initiated when a timeout is indicated by a particular array timer value associated with a particular active connection, the computer system function being associated with one of the timers used for the particular active connection.

39. The computer readable medium of claim 38 wherein the single array timer value for each active connection is associated with the timer that will expire earliest out of the timers for the active connection.

40. The computer readable medium of claim 38 wherein when the timeout is indicated, at least one of a plurality of table timer values is referenced in a connection table, each table timer value being associated with one of the timers used for the particular active connection.

41. A system for examining and processing timers for a computer system, the system comprising:
 a timer task for scanning a plurality of array timer values for timeouts, the array timer values stored in a timer array and each array timer value representing a timer, wherein a single array timer value is stored in the timer array for each one of a plurality of active network connection to the computer system, and wherein each one of the active network connections is associated with a plurality of timers; and
 a processing task for initiating a computer system function for a particular active connection when a timeout has been indicated by the timer task, the computer system function being associated with one of the timers used for the particular active connection.

42. The system of claim 41 wherein the single array timer value for each active connection is associated with the timer that will expire earliest out of the timers for the active connection.

43. The system of claim 41 wherein when the timeout is indicated, the processing task references at least one of a plurality of table timer values in a connection table, each table timer value being associated with one of the timers used for the particular active connection.

44. A computer readable medium including program instructions to be implemented by a computer, the program instructions for restarting a timer for a computer system, the program instructions implementing steps comprising:
 (a) starting a timer, the timer for determining when a timeout occurs for an associated network connection of the computer system;
 (b) restarting the timer if data is received from or transmitted to the connected computer system before the timeout occurs and after a predetermined time interval after the timer is started; and
 (c) not restarting the timer if data is received from or transmitted to the connected computer system before the timeout occurs and within the predetermined time interval after the timer is started.

45. A system for restarting a timer for a computer system, the system comprising:
 a timer starter for starting a timer, the timer for determining when a timeout occurs for an associated network connection of the computer system; and
 a timer restarter for restarting the timer if data is received from or transmitted to the connected computer system before the timeout occurs and after a predetermined time interval after the timer is started, wherein the timer is not restarted if data is received from or transmitted to the connected computer system before the timeout occurs and within the predetermined time interval after the timer is started.

* * * * *